Dec. 9, 1941.  J. T. WARD ET AL  2,265,558
SEPARATING HYDROCARBON FLUIDS
Filed April 7, 1939
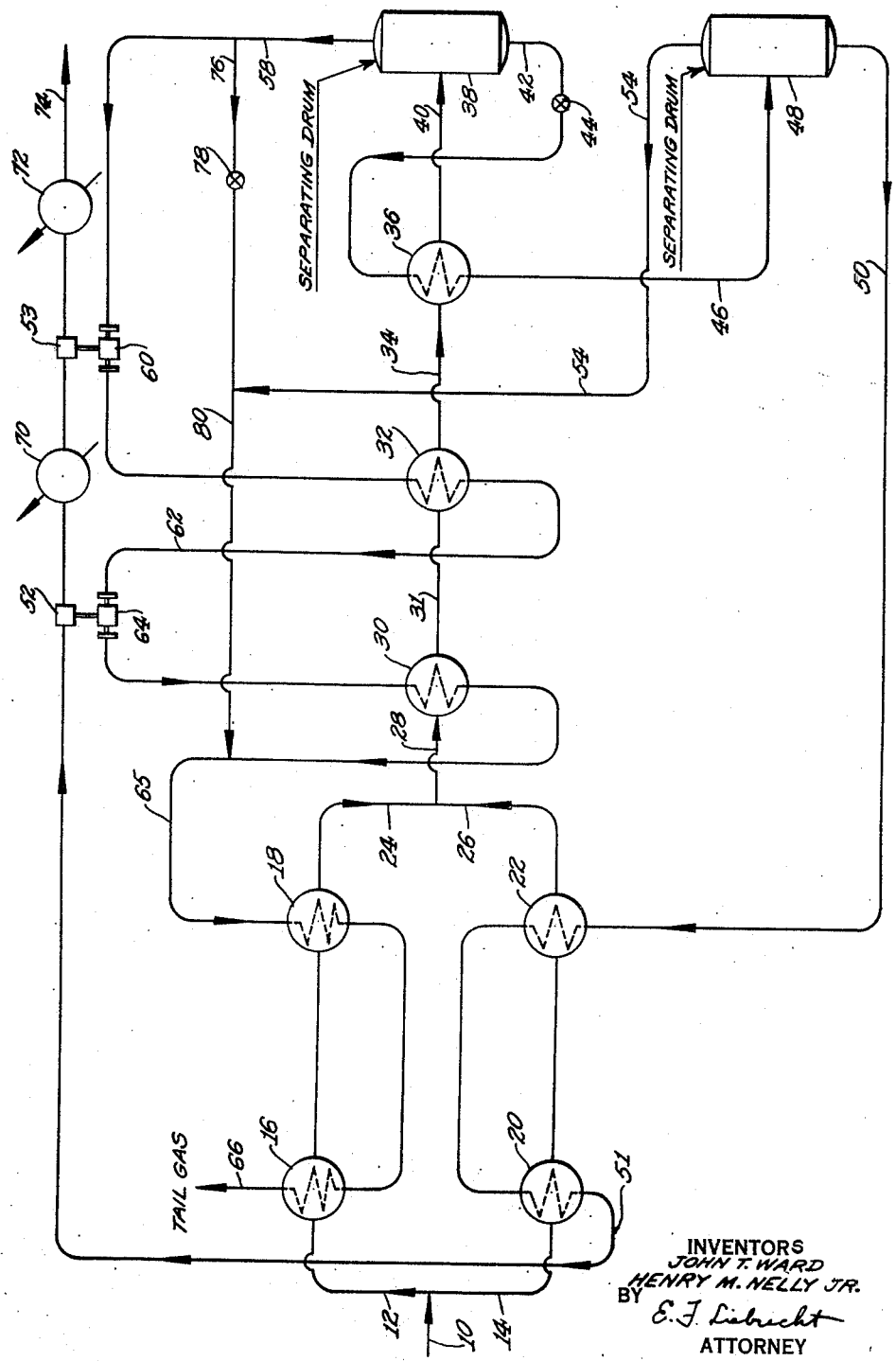
INVENTORS
JOHN T. WARD
HENRY M. NELLY JR.
BY E. J. Liebrecht
ATTORNEY Patented Dec. 9, 1941

2,265,558

UNITED STATES PATENT OFFICE 2,265,558

SEPARATING HYDROCARBON FLUIDS

John T. Ward, Westfield, N. J., and Henry M. Nelly, Jr., New York, N. Y., assignors to The M. W. Kellogg Company, New York, N. Y., a corporation of Delaware Application April 7, 1939, Serial No. 266,504

10 Claims. (Cl. 62—175.5)

This invention relates to a method of separating desired constituents from a gaseous mixture containing normally gaseous hydrocarbons.

According to this invention a fresh feed of lean hydrocarbon gas or other hydrocarbon gaseous mixtures containing desired constituents may be treated to separate desired constituents. The feed gas is usually at a relatively high pressure and it is preferred under pressure for this process as the necessity for compressors is then eliminated. According to this invention the feed gas under superatmospheric pressure is cooled to a relatively low temperature in stages to separate a liquefied fraction containing desired constituents such as $C_3$, $C_4$ and $C_5$ hydrocarbons from waste or tail gases. The liquefied fraction and the waste gases are utilized to cool fresh feed gas to the desired temperature to effect separation of desired constituents.

In one form of the invention the feed gas is divided into two streams and one stream passes in heat exchange relation with cold tail or waste gases separated during the process and is partly liquefied. The cold waste gases are passed through other heat exchangers and through expansion engines before being used to cool the one stream of fresh feed gas just described. After indirect contact with this stream of feed gas the waste gases are discarded. The second stream of gas feed is passed through heat exchangers wherein it is indirectly contacted with a low temperature liquefied product which contains desired constituents recovered during the operation of the process. By this heat exchange the fresh feed gas under superatmospheric pressure is reduced to a relatively low temperature and is partly liquefied.

The streams of feed gas are then combined and the combined stream passed through heat exchangers wherein the feed gas is further cooled by indirectly contacting cold tail or waste gases before the tail or waste gases are passed in heat exchange relation with the first stream of feed gas. The stream of feed gas, partly liquefied is then further cooled and additional amounts liquefied by being indirectly contacted with expanded and cooled liquid product separated in a first separating drum from the refrigerated gas feed containing liquefied constituents. The refrigerated gas feed is then passed to the first separating drum for separating liquefied products from waste gas products containing methane. The liquefied products are withdrawn from the first separating drum and passed through a pressure reducing valve to expand and further cool the liquefied products and these cooled and liquefied products are the ones used for indirectly contacting and cooling the refrigerated and partly liquefied feed gas before it is introduced into the first separating drum.

The cooled liquefied product is then introduced into a second separating drum at a lower temperature to further separate liquefied products from waste gas products containing $C_1$ and $C_2$ hydrocarbons. The liquefied products contain the desired $C_3$, $C_4$ and $C_5$ hydrocarbons constituents and may be used as feed for a conversion unit such as a polymerization unit. The cooled and separated liquefied products are at a relatively low temperature and are used for indirectly contacting and preliminarily cooling the second stream of the fresh gas feed as above described. The fraction containing the desired $C_3$, $C_4$ and $C_5$ hydrocarbon constituents is then preferably compressed to a higher pressure suitable for use in a polymerization unit or other conversion unit or process. The compressor or compressors necessary for compressing the desired fraction to the desired pressure are preferably run by an expansion engine or engines operated by a portion or all of the tail gases which are separated during the operation of the process.

The waste gases separated from the first separating drum are at a superatmospheric pressure only slightly less than the pressure under which the feed gas was introduced at the beginning of the operation. These gases are also at a relatively low temperature. As the cold and compressed gases leaving the first separating drum are waste gases, it is desirable to utilize the pressure under which they are held and utilize the refrigerating effect of the gases before releasing the gases as waste products. A portion or all of the waste gases from the first separating drum is passed through an expansion engine or engines or the like which are used to operate a compressor or compressors for compressing the fraction containing desired constituents to a pressure suitable for the conversion unit. Preferably these waste gases are first passed through one expansion engine, through a heat exchanger and then through another expansion engine.

In the first expansion engine the gases are cooled to a relatively low temperature and these cooled gases are passed through a heat exchanger or exchangers for cooling the gas feed undergoing treatment as above described. The first expansion engine operates the higher pressure compressor. The gases after this heat exchange are still at a relatively high pressure and are preferably passed through the second expansion engine which is used to run the compressor which initially compresses the separated fraction containing desired constituents for a polymerization unit or the like. By this second expansion, the waste gases are again cooled to a relatively low temperature and are again used for indirectly contacting and cooling the fresh feed and then the cold waste gases are further indirectly contacted with the first stream of the fresh gaseous feed as above described to preliminarily cool the gas feed and further raise the temperature of the waste gases. The waste gases are then removed from the system.

A part of the waste gases leaving the top of the first separating drum may be passed through a pressure reducing valve to reduce the pressure on the gases and cause expansion and cooling thereof. After passing through the pressure reducing valve, these cooled and expanded gases are preferably combined with the cold waste gases leaving the top of the second separating drum and the combined stream is mixed with the waste gases before they pass through the heat exchangers for cooling the first stream of the fresh gaseous feed above described.

In the drawing the figure represents a diagrammatical showing of apparatus adapted for carrying out this invention but other forms of apparatus may be used.

Referring now to the drawing the reference character 10 designates a line for introducing fresh gaseous feed into the system. This fresh gas feed comprises a lean gas containing $C_3$, $C_4$ and $C_5$ hydrocarbons which are to be recovered. The fresh gas feed contains saturated and unsaturated normally gaseous hydrocarbons.

The fresh gaseous feed may comprise gases such as refinery gases or similar gases from other sources which are usually under superatmospheric pressure and the gas feed is directly introduced into the system for separating desired constituents therefrom. The feed gas is preferably under pressure and in this way the necessity for compressors is eliminated and the process is cheaper to operate. However, if the fresh feed is at a relatively low pressure, it will be necessary to compress the gas to raise it to superatmospheric pressure. In one example using this invention the fresh gaseous feed is under an atmospheric pressure of about 220 pounds per square inch and at a temperature of about 80° F. During the description of the process reference will be made to an example but operating conditions may be varied as desired and need not be restricted to those given.

Using the pressure above mentioned and with a fresh gaseous feed containing about 88.8% of methane, about 5.9% of $C_2$ hydrocarbons, about 3.4% of $C_3$ hydrocarbons, about 1.8% of $C_4$ hydrocarbons and about 0.1% of $C_5$ hydrocarbons, the fresh feed at a temperature of about 80° F. is preferably subdivided into two streams passing through lines 12 and 14, respectively. In the example which will be given in connection with the method of separation, the percentages of the gaseous mixtures are mol percent and the pressures are given as absolute pressures.

One of the streams of the fresh feed is cooled by indirectly contacting it with cold tail gases or waste gases. The waste gases are to be discarded and since it is desired to cool the fresh feed as much as possible and to utilize most of the refrigerating effect of the waste gases, a larger proportion of the fresh gaseous feed is passed through line 12 than through line 14. For example, about twice the weight of gases is passed through line 12 as is passed through line 14. The stream of fresh feed passing through line 12 is passed through heat exchangers 16 and 18 wherein it is indirectly contacted with cold waste gases as will be hereinafter more fully described. The tail gases are then discarded. The fresh gaseous feed leaving the first heat exchanger 16 has its temperature reduced to about −10° F. and after passing through the second heat exchanger 18 the gaseous feed has its temperature further reduced to about −82° F. and a part of the gaseous feed is liquefied.

The other stream of fresh gaseous feed passing through line 14 is passed through heat exchangers 20 and 22 wherein they indirectly contact liquefied normally gaseous hydrocarbons which have been separated as a desired fraction during the later stages of the process as will be hereinafter described. This fraction during the separation process is maintained at a relatively low temperature and before using this fraction as a feed for a polymerization unit or before storing this fraction it is desirable to raise the temperature thereof and utilize the refrigerating effect thereof. This is effected by indirectly contacting the cold liquefied product with the stream of fresh gaseous feed passing through line 14 and heat exchangers 20 and 22. The desired fraction after passing through heat exchanger 20 is compressed as will be hereinafter described and then may be used as feed for a polymerization unit or the like. Instead of using the plurality of heating exchangers 16 and 18 in line 12 and heat exchangers 20 and 22 in line 14, only one heat exchanger may be used in each line but preferably a plurality of heat exchangers is used for the reason that better heat exchange is obtained.

The stream of gaseous feed passing through line 14 is passed through the first heat exchanger 20 wherein its temperature is lowered to about −10° F. and after passing through the second heat exchanger 22, its temperature is further reduced to about −82° F. During this cooling some of the gaseous products or constituents of the gaseous feed are liquefied. The one stream of partly liquefied feed gas leaves the heat exchanger 18 through line 24 and the other stream leaves the heat exchanger 22 through line 26 and the streams 24 and 26 are then merged and passed through line 28, through heat exchanger 30 wherein the gaseous feed is further cooled by indirectly contacting the cold tail or waste gases which are separated during later steps in the process and which are at a relatively low temperature as will be hereinafter more fully described.

The further cooled gaseous feed after leaving the heat exchanger 30 is at a temperature of about −95° F. and is then passed through line 31 and heat exchanger 32 wherein it is indirectly contacted with the cold tail or waste gas from the process for further cooling the gaseous feed to about −103° F. During this further cooling additional amounts of normally gaseous constituents of the gaseous feed are liquefied.

The cooled gaseous feed is then passed through heat exchanger 36 wherein it is indirectly contacted with cold expanded liquid products withdrawn from a separating drum 38 and the gaseous feed is further cooled to about −110° F. to further liquefy portions of the gaseous feed. The cooled and liquefied products are passed through line 40 and introduced into the separating drum 38 for separating liquefied constituents from waste or tail gases, the liquefied constituents being withdrawn from the bottom of drum 38 and the waste gases being withdrawn from the top of the drum. The waste gases here separated form part of the tail or waste gases which are used to refrigerate the fresh gas feed by means of the heat exchangers as above described.

In this separating drum 38 the cooled and liquefied products are maintained under a pressure of about 200 pounds per square inch so that it will be seen that a pressure drop of about 20 pounds per square inch occurred during the passage of the feed gas through the lines and heat exchangers. The liquefied fraction contains about 37.2% of methane, about 20.2% of $C_2$ hydrocarbons, about 26.6% of $C_3$ hydrocarbons, about 15.2% of $C_4$ hydrocarbons and about 0.8% of $C_5$ hydrocarbons. The separated gaseous fraction contains about 95.7% of methane, about 4.0% of $C_2$ hydrocarbons, about 0.3% of $C_3$ hydrocarbons and zero percents of $C_4$ and $C_5$ hydrocarbons.

The liquefied fraction is withdrawn from the bottom of the separating drum 38 through line 42 and passed through pressure reducing valve 44 in order to reduce the pressure on the liquefied product to cause expansion and cooling thereof. After passing through the pressure reducing valve 44, the liquefied fraction is under a pressure of about 30 pounds per square inch and at a reduced temperature of about $-180°$ F. This expanded and cooled liquefied product is passed through the heat exchanger 36 for final cooling of the feed gas by indirect heat exchange before the gaseous feed is introduced into the separating drum 38 as above described.

After passing through the heat exchanger 36, the liquefied product is at a temperature of about $-130°$ F. and is passed through line 46 to a second separating drum 48 for a further separation at a lower temperature of liquefied constituents from waste gases. With two separating drums at different temperatures, a better separation of desired constituents is obtained. The liquefied product separated in the second separating drum 48 contains about 5.2% of methane, about 24.1% of $C_2$ hydrocarbons, about 43.7% of $C_3$ hydrocarbons, about 25.6% of $C_4$ hydrocarbons and about 1.4% of $C_5$ hydrocarbons. The waste or tail gases separated in the second separating drum 48 contain about 84.0% of methane, about 14.5% of $C_2$ hydrocarbons, about 1.5% of $C_3$ hydrocarbons, and zero percentages of $C_4$ and $C_5$ hydrocarbons. These waste or tail gases form part of the tail or waste gases used to refrigerate the fresh gaseous feed by means of heat exchangers as above described.

The liquefied product separated in the second drum 48 contains desired constituents which may be furthmer treated in a conversion process for obtaining gasoline constituents. For example, this fraction may be introduced into a polymerization unit for effecting the desired conversion. However, the liquefied product is at a low temperature of about $-130°$ F. and under a superatmospheric pressure of about 30 pounds per square inch. The liquefied product may be used for refrigeration in other steps in the process before being passed to a polymerization unit, for example, and it is therefore withdrawn from the second separating drum 48 and passed through line 50 and through heat exchangers 22 and 20 where it indirectly contacts the second stream of the fresh gaseous feed passing through line 14 as above described.

After passing through heat exchanger 22, the fraction containing the desired constituents has its temperature raised to about $-30°$ F. and after passing through heat exchanger 20, it has its temperature raised to about $+24°$ F. After leaving the heat exchanger 20, the desired fraction is then passed through line 51 and is then compressed by passing through successive compressors 52 and 53 which are preferably run by expansion engines operated by the relatively high pressure waste gases as will be hereinafter described. The separated waste gases leaving the upper portion of the second separating drum 48 through line 54 are preferably combined with a portion of the waste gases leaving the upper portion of the first separating drum 38 as will be presently described.

All or a portion of the waste or tail gases leaving the upper portion of the first separating drum 38 through line 58 is passed through an expansion engine 60 in order to reduce the pressure on the waste gases before they leave the system and at the same time to perform useful work. The expansion engine 60 runs the second compressor 53 for further compressing the desired fraction which was removed from the second separating drum 48. The desired fraction is passed through the first compressor 52 before it passes through the second compressor 53. In passing through the expansion engine 60, the waste gas becomes cooled to a temperature of about $-168°$ F. and is passed through the heat exchanger 32 for cooling the fresh feed passing through line 31 by indirect contact as before described.

In passing through the heat exchanger 32, the temperature of the waste gas is raised to about $-120°$ F. and as the waste gas is still under a relatively high superatmospheric pressure it is passed through line 62 and through a second expansion engine 64 in order to further lower the pressure on the gas by doing work and to obtain additional refrigeration thereof. The second expansion engine 64 is used to run the first compressor 52 for initially compressing the desired fraction separated from the second separating drum 48 before passing it through second compressor 53. In some instances only one compressor may be used.

The waste gas in passing through the second expansion engine 64 has its temperature lowered to about $-176°$ F. and is then passed through the heat exchanger 30 for further cooling the preliminarily cooled and combined stream of the fresh gaseous feed passing through line 28 by indirect contact as above described. The waste gases after passing through the heat exchanger 30 are at a temperature of about $-95°$ F. and are then passed through line 65 and through heat exchangers 18 and 16 for preliminarily cooling the one stream of gaseous feed passing through line 12 as described in the beginning of the operation. The waste gases leave the system through line 66.

A portion of the waste gases leaving the first separating drum 38 and passing through line 58 is preferably passed through line 76 having a pressure reducing valve 78 for reducing the pressure on the gases to cause expansion and cooling thereof. After the expansion the gases are at a temperature of about $-127°$ F. and under a pressure of about 30 pounds per square inch. These expanded waste gases are preferably combined with the waste gases leaving the upper portion of the second separating drum 48 and the merged stream at a temperature of about −127° F. is combined with the stream of waste gases passing through line 65 and this combined stream is passed through the heat exchangers 18 and 16 as just described.

After merging the streams of waste gases, the temperature of the waste gases is about −116° F. After passing through the heat exchanger 18, the waste gases are at a temperature of about −24° F. After passing through the heat exchanger 16, the gases are at a temperature of about +45° F. and under a pressure of about 20 pounds per square inch and they leave the system through line 66 at this temperature and pressure.

The fraction containing $C_3$, $C_4$ and $C_5$ hydrocarbons separated from gases in the second separating drum 48 after passing through heat exchangers 22 and 20 is at a temperature of about +24° F. and under a pressure of 30 pounds per square inch. If it is desired to pass this fraction to a storage tank under pressure or to use these constituents as a feed for a conversion process, such as a polymerization unit, for example, the separated fraction is compressed to a relatively high pressure.

This compression can be effected by utilizing the energy in the waste gases which are under pressure, the waste gases being used to run expansion engines which are used to operate the compressors. The separated fraction containing the desired constituents is therefore passed through the first compressor 52 which is driven by the second expansion engine 64 run by waste gases separated in the process and the pressure of the desired fraction is raised to about 90 pounds per square inch. During the compression the separated fraction becomes heated and where cooling is desired, it is passed through a cooler 70. If a higher pressure is necessary or desired, the desired fraction is further compressed by being passed through the second compressor 53 driven by the first expansion engine 60 run by waste gases separated in the process. The pressure on the separated fraction is raised to about 400 pounds per square inch and may then be used as desired either as a feed for a conversion process or the like. In some instances it may be desirable to cool the compressed gases leaving the second compressor 53 and in these instances the compressed gases may be passed through a cooler 72 and then through line 74. The cooler 72 may be omitted.

While one form of apparatus has been described and a specific example for a gaseous feed has been given, it is to be understood that these are by way of illustration only and other apparatus may be used and the operating conditions for the process may be changed for the same feed or when using other gaseous feeds without departing from the spirit of the invention.

We claim:

1. In a method of treating gaseous mixtures containing normally gaseous hydrocarbons to separate desired hydrocarbon constituents, the steps which comprise cooling a gaseous mixture of normally gaseous hydrocarbons under a relatively high pressure to a relatively low temperature to liquefy some of the constituents thereof, passing the cooled mixture to a drum to separate liquefied normally gaseous constituents from gases, withdrawing the liquefied portion from said drum and reducing the pressure thereon to effect cooling thereof while vaporizing lighter constituents thereof, passing the expanded and further cooled mixture to a second separating drum to separate desired liquefied constituents from gases, using the desired liquefied constituents to partly cool the gaseous mixture to be treated, passing at least a portion of the waste gases from said first separating drum through an expansion engine to run a compressor for compressing the last mentioned desired constituents and raise them to a desired pressure while cooling the waste gases passing through said engine, and combining the cooled waste gases with waste gases separated from said second separating drum and using the combined waste gases to partly cool the gaseous mixture to be treated.

2. In a method of treating mixtures containing normally gaseous hydrocarbons to separate desired hydrocarbon constituents, the steps which comprise cooling a gaseous mixture of normally gaseous hydrocarbons under a relatively high pressure to a relatively low temperature to liquefy some of the constituents thereof, passing the thus cooled mixture to a drum to separate liquefied normally gaseous constituents from waste gases, withdrawing the liquefied portion from said drum and reducing the pressure thereon to effect cooling thereof while vaporizing constituents thereof, passing the thus cooled mixture to a second separating drum to separate the desired liquefied constituents from waste gases, using the last mentioned liquefied constituents to partly cool the gaseous mixture to be treated, passing at least a portion of the waste gases from said first separating drum through an expansion engine to run a compressor for compressing the separated desired constituents and raise them to a desired pressure while cooling such waste gases, using such cooled waste gases to partly cool the gaseous mixture being treated, then passing such waste gases through a second expansion engine to run another compressor for compressing the desired constituents and cooling the waste gases at the same time, and combining the last mentioned cooled waste gases with waste gases separated from said second separating drum and using the combined waste gases to partly cool the gaseous mixture to be treated.

3. In a method of treating mixtures containing normally gaseous hydrocarbons to separate desired hydrocarbon constituents, the steps which comprise cooling a gaseous mixture of normally gaseous hydrocarbons to a relatively low temperature while under a relatively high pressure to liquefy some of the constituents thereof, passing the cooled mixture to a drum to separate liquefied normally gaseous constituents from waste gases, withdrawing the liquefied portion from said drum and reducing the pressure thereon to effect cooling thereof while vaporizing lighter constituents thereof, passing the thus cooled mixture to a second separating drum to separate desired liquefied constituents from waste gases, using the last mentioned liquefied constituents to partly cool the gaseous mixture to be treated, expanding and further cooling at least a portion of the waste gases from said first separating drum and combining the expanded and cooled waste gases with waste gases separated from said second separating drum and using the combined waste gases to partly cool the gaseous mixture to be treated.

4. In a method of treating gaseous mixtures containing normally hydrocarbons to separate desired hydrocarbon constituents, the steps which comprise cooling a gaseous mixture of normally gaseous hydrocarbons under a relatively high pressure to a relatively low temperature to liquefy some of the constituents thereof, passing the cooled mixture to a drum to separate liquefied normally gaseous constituents from waste gases, withdrawing at least a portion of the gases and reducing the pressure thereon to cool the gases and using the cooled gases to partly cool the gaseous mixture to be treated, withdrawing the liquefied portion from said drum and reducing the pressure thereon to effect further cooling thereof while vaporizing lighter constituents thereof, passing the cooled mixture to a second separating drum to separate the desired liquefied constituents from waste gases, using the liquefied constituents to partly cool the gaseous mixture to be treated and using the waste gases from said second separating drum to partly cool the gaseous mixture to be treated.

5. In a method of treating mixtures containing normally gaseous hydrocarbons to separate desired hydrocarbon constituents, the steps which comprise cooling a gaseous mixture of normally gaseous hydrocarbons under a relatively high pressure to a relatively low temperature to liquefy some of the constituents thereof, passing the thus cooled mixture to a drum to separate liquefied normally gaseous constituents from waste gases, withdrawing the liquefied portion from said drum and reducing the pressure thereon to effect cooling thereof while vaporizing lighter constituents thereof, using the thus cooled mixture for further cooling the partly liquefied gaseous mixture before introducing it into said drum, then passing the further cooled mixture to a second separating drum to separate desired liquefied constituents from waste gases, using the last mentioned liquefied constituents to partly cool the gaseous mixture to be treated and using the waste gases from said separating drums to partly cool the gaseous mixture to be treated.

6. In a method of treating mixtures containing normally gaseous hydrocarbons to separate desired hydrocarbon constituents, the steps which comprise cooling a mixture of normally gaseous hydrocarbons under a relatively high pressure to a relatively low temperature to liquefy some of the constituents thereof, passing the cooled mixture to a drum to separate liquefied normally gaseous constituents from waste gases, withdrawing the liquefied portion from said drum and reducing the pressure thereon to effect further cooling thereof while vaporizing the relatively light constituents, passing the cooled mixture to a second separating drum to separate the desired liquefied constituents from waste gases, passing the last mentioned liquefied constituents in indirect heat exchange with a portion of the mixture of normally gaseous hydrocarbons to be treated and passing the waste gases from said separating drums in indirect heat exchange with another portion of the mixture of normally gaseous hydrocarbons to be treated to cool the mixture.

7. In a method of treating mixtures containing normally gaseous hydrocarbons to separate desired hydrocarbon constituents, the steps which comprise cooling a mixture of normally gaseous hydrocarbons under a relatively high pressure to a relatively low temperature to liquefy some of the constituents thereof, passing the cooled mixture to a separating zone to separate liquefied normally gaseous constituents from waste gases, withdrawing the liquefied portion from said separating zone and reducing the pressure thereon to effect further cooling thereof while vaporizing lighter constituents, passing the cooled mixture to a second separating zone to separate the liquefied constituents from waste gases, using the last mentioned liquefied constituents to partly cool the mixture of normally gaseous hydrocarbons to be treated and using the waste gases from said separating zones to partly cool the mixture of normally gaseous hydrocarbons to be treated.

8. A method of treating mixtures containing normally gaseous hydrocarbons to separate desired constituents which comprises, passing a mixture of normally gaseous hydrocarbons under a relatively high pressure through heat exchangers, cooling the mixture by indirectly contacting it with cold waste gases and a cold liquefied hydrocarbon fraction, passing the cooled and partially liquefied normally gaseous mixture through another heat exchanger wherein it is further cooled and additional amounts thereof liquefied by indirectly contacting it with an expanded and cooled liquefied product withdrawn from a separating drum, passing the cooled and liquefied mixture into said separating drum for separating liquefied product from waste gases, withdrawing at least a part of the waste gases and reducing the pressure thereon to cool it and passing it through certain of said heat exchangers for cooling the normally gaseous mixture, expanding and further cooling the separated liquefied product and passing it through said heat exchanger ahead of said separating drum for cooling the gaseous mixture before it is introduced into said separating drum, then introducing the expanded and liquefied product into a second separating drum at a lower temperature and under a lower pressure than maintained in said first separating drum to separate a desired hydrocarbon fraction from waste gases, and passing the desired hydrocarbon fraction through certain of said heat exchangers in indirect contact with the gaseous mixture to be treated.

9. A method of treating mixtures containing normally gaseous hydrocarbons to separate desired constituents which comprises, passing a mixture of normally gaseous hydrocarbons under a relatively high pressure through heat exchangers, cooling the mixture by indirectly contacting it with cold waste gases and a cold liquefied hydrocarbon fraction, passing the cooled and partially liquefied normally gaseous mixture through another heat exchanger wherein it is further cooled and additional amounts thereof liquefied by indirectly contacting it with an expanded and cooled liquefied product withdrawn from a separating drum, passing the cooled and liquefied mixture into said separating drum for separating liquefied product from waste gases, passing at least a part of the waste gases through certain of said heat exchangers for cooling the normally gaseous mixture, expanding and further cooling the separated liquefied product and passing it through said heat exchanger ahead of said separating drum for cooling the partly liquefied gaseous mixture before it is introduced into said separating drum, then introducing the expanded and liquefied product into a second separating drum at a lower temperature and under a lower pressure than maintained in said first separating drum to separate a desired hydrocarbon fraction from waste gases, expanding at least a portion of the first mentioned waste gases and combining them with the last mentioned waste gases and passing the combined stream through certain of said heat exchangers for cooling the gaseous mixture to be treated.

10. A method of treating mixtures containing normally gaseous hydrocarbons to separate desired constituents which comprises, passing a gaseous mixture of normally gaseous hydrocarbons under a relatively high pressure as separate streams through heat exchangers, cooling one stream by indirectly contacting it with cold waste gases, cooling the other stream by indirectly contacting it with a cold hydrocarbon fraction containing desired constituents, combining the streams of cooled and partially liquefied normally gaseous hydrocarbons and passing the combined stream through another heat exchanger wherein it is further cooled and partly liquefied by indirect contact with cold waste gases, passing the cooled and partially liquefied normally gaseous mixture through another heat exchanger wherein it is further cooled and additional amounts thereof liquefied by indirectly contacting it with an expanded and cooled liquefied fraction withdrawn from a separating drum, passing the cooled and liquefied mixture into said separating drum for separating a liquefied fraction from waste gases, expanding and further cooling the separated liquefied fraction and using it to further cool the cooled and partially liquefied gaseous mixture before it is introduced into said separating drum by passing it through said heat exchanger ahead of said separating drum, then introducing the liquefied fraction into a second separating drum at a lower temperature and under a lower pressure than maintained in said first separating drum to separate a desired hydrocarbon fraction from waste gases, passing the waste gases from said separating drums through certain of said heat exchangers, and using the cold desired hydrocarbon fraction to cool the other stream of gaseous mixture to be treated.

JOHN T. WARD.
HENRY M. NELLY, Jr.

CERTIFICATE OF CORRECTION.

Patent No. 2,265,558. December 9, 1941.

JOHN T. WARD, ET AL.

It is hereby certified that error appears in the printed specification of the above numbered patent requiring correction as follows: Page 1, second column, line 12, for "hydrocarbons" read --hydrocarbon--; page 3, first column, line 64, for "furthmer" read --further--; page 5, first column, line 1, after "normally" insert --gaseous--; and that the said Letters Patent should be read with this correction therein that the same may conform to the record of the case in the Patent Office.

Signed and sealed this 17th day of March, A. D. 1942.

(Seal)

Henry Van Arsdale,
Acting Commissioner of Patents.